(12) United States Patent
Narla et al.

(10) Patent No.: US 9,397,504 B1
(45) Date of Patent: Jul. 19, 2016

(54) HYBRID INVERTER POWER CONTROL SYSTEM FOR PV STRING, BATTERY, GRID AND BACK-UP LOADS

(71) Applicant: SolarCity Corporation, San Mateo, CA (US)

(72) Inventors: Sandeep Narla, San Jose, CA (US); Eric Daniel Carlson, San Mateo, CA (US); Andrew Russell Lutkus, Martinez, CA (US)

(73) Assignee: SolarCity Corporation, San Mateo, CA (US)

( * ) Notice: Subject to any disclaimer, the term of this patent is extended or adjusted under 35 U.S.C. 154(b) by 0 days.

(21) Appl. No.: 14/798,069

(22) Filed: Jul. 13, 2015

Related U.S. Application Data (60) Provisional application No. 62/151,257, filed on Apr. 22, 2015.

(51) Int. Cl.
| | | |
|---|---|---|
| *H02J 1/00* | (2006.01) | |
| *H02J 4/00* | (2006.01) | |
| *H02J 7/02* | (2016.01) | |
| H02J 3/38 | (2006.01) | |
| H02S 40/38 | (2014.01) | |
| G05F 1/67 | (2006.01) | |
| H02J 7/35 | (2006.01) | |
| H02S 40/32 | (2014.01) | |

(52) U.S. Cl.
CPC . *H02J 4/00* (2013.01); *H02J 7/022* (2013.01); *G05F 1/67* (2013.01); *H02J 3/385* (2013.01); *H02J 7/35* (2013.01); *H02S 40/32* (2014.12); *H02S 40/38* (2014.12); *Y02E 10/56* (2013.01); *Y02E 10/563* (2013.01); *Y02E 10/566* (2013.01); *Y04S 20/525* (2013.01)

(58) Field of Classification Search
CPC .............. H02J 4/00; H02J 7/022; H02J 7/35; H02J 3/385; Y02E 10/56; Y02E 10/563; Y02E 10/566; H02S 40/32; H02S 40/38; G05F 1/67; Y04S 20/525
See application file for complete search history.

(56) References Cited

U.S. PATENT DOCUMENTS

| | | | | |
|---|---|---|---|---|
| 2008/0091625 | A1* | 4/2008 | Kremen | G01D 4/004 |
| | | | | 705/412 |
| 2011/0215640 | A1* | 9/2011 | Donnelly | H02J 1/10 |
| | | | | 307/21 |
| 2011/0273917 | A1* | 11/2011 | Maitra | H02J 3/383 |
| | | | | 363/74 |
| 2012/0193987 | A1* | 8/2012 | Siglock | H02J 3/386 |
| | | | | 307/64 |
| 2015/0229268 | A1* | 8/2015 | Satake | H02S 40/32 |
| | | | | 136/244 |
| 2015/0263668 | A1* | 9/2015 | Sader | H02S 40/34 |
| | | | | 439/395 |

* cited by examiner

*Primary Examiner* — Daniel Cavallari
(74) *Attorney, Agent, or Firm* — Kilpatrick Townsend & Stockton LLP (57) ABSTRACT

A string inverter for use with a photovoltaic array includes a string-level DC input channel for receiving DC power from a photovoltaic array. The input channel performs channel-level maximum power point tracking. An input-output channel connects the string inverter to a battery pack. A DC to DC buck-boost circuit between the at least one DC input channel and the at least one input-output channel prevents more than a predetermined amount of DC voltage from reaching the battery pack. A DC to AC inverter circuit having an AC output serving as an output of the string inverter. A revenue grade power meter is configured to measure the AC output of the string inverter.

14 Claims, 5 Drawing Sheets

HYBRID INVERTER POWER CONTROL SYSTEM FOR PV STRING, BATTERY, GRID AND BACK-UP LOADS

CROSS-REFERENCES TO RELATED APPLICATIONS

The present application claims the benefit of U.S. Provisional Application No. 62/151,257, filed Apr. 22, 2015, which is hereby incorporated by reference for all purposes.

BACKGROUND OF THE INVENTION

Due to decreasing costs, state and federal tax incentives, and increased evidence and awareness of the correlation between $CO_2$ emissions and climate change, photovoltaic or "solar" power systems are becoming increasingly popular with consumers, businesses and utility companies. A basic solar power system consists of an array of solar panels connected together on one or more strings, a combiner for combining the outputs of the one or more strings, one or more string inverters for converting the combined direct current (DC) output from the strings to alternating current (AC), and a physical interface to AC grid power—typically on the load side of the utility meter, between the meter and the customer's main electrical panel.

The next step in the evolution of solar power system is on-site energy storage. Energy storage is important for a number of reasons. First, it provides a potential source of power when the grid is unavailable (outage). Second, in states and/or countries where the customer is unable to be compensated for sending power back to the grid or is compensated below the retail rate, it allows the customer to store the energy generated during the day—specifically when the solar array is generating the most power—and then consume that power after the sun has set reducing the customer's peak demand. Third, it allows the customer to supply power back to the grid at a time when the grid needs power the most. Localized energy storage can help utilities stabilize the grid by supplying power to enhance demand response, shave demand peaks, and shift loads to times of lower demand. Fourth, it provides a mechanism for storing grid power when demand is lower (i.e., when there is a surplus of power), smoothing utility companies' power demand curve from the bottom up. Fifth, by enabling customers to store energy onsite, it may be possible to bill customers for energy supplied to back-up loads when the grid is unavailable (e.g., during an outage).

BRIEF SUMMARY OF THE INVENTION

In accordance with one embodiment, a string inverter for use with a photovoltaic array includes a string-level DC input channel for receiving DC power from a photovoltaic array. The input channel performs channel-level maximum power point tracking. An input-output channel connects the string inverter to a battery pack. A DC to DC buck-boost circuit between the at least one DC input channel and the at least one input-output channel limits the amount of DC voltage from reaching the battery pack so that it does not exceed a predetermined threshold. A DC to AC inverter circuit having an AC output serving as an output of the string inverter. A revenue grade power meter is configured to measure the AC output of the string inverter.

In one embodiment, the string inverter includes a three position switch, wherein in a first position, AC power is permitted to flow from the string inverter to a load side of a customer utility meter and one or more back-up loads, in a second position, power is permitted to flow from the load side of a customer utility meter to the one or more back-up loads bypassing the string inverter, and in a third position, all circuits tied to the string inverter's output are electrically disconnected from each other.

In another embodiment, the string inverter further includes a first circuit for metering the total DC power received at the at least one DC input channel from the photovoltaic array, a second circuit for metering a total DC power received at the at least one input-output channel from the battery pack, and a controller programmed to determine the portion of total AC output measured by the revenue grade power meter attributable to the at least one DC input channel and the at least one input-output channel.

In another embodiment, the string inverter is operable to receive AC power, to rectify the AC power to DC power, and to deliver the rectified DC power to the battery pack.

In accordance with another embodiment, a string inverter for use with a photovoltaic array includes at least one string-level DC input channel for receiving DC power from a photovoltaic array, at least one input-output channel for connecting the string inverter to a battery pack, a DC to AC inverter circuit having an AC output serving as an output of the string inverter, and a switch controlling a flow of power through the string inverter. In one variation, the switch is configured so that in a first state, AC power is permitted to flow from the string inverter to a load side of a customer utility meter and one or more back-up loads, in a second state, power is permitted to flow from the load side of a customer utility meter to the one or more back-up loads bypassing the string inverter, and in a third state, all circuits tied to the string inverter's output are electrically disconnected from the inverter.

In accordance with another embodiment, a string inverter for use with a photovoltaic array includes at least one string-level DC input channel for receiving DC power from a photovoltaic array, at least one input-output channel for connecting the string inverter to a battery pack, a DC to AC inverter circuit having an AC output serving as an output of the string inverter, and a revenue grade power meter configured to measure the AC output of the string inverter. In one variation, the revenue grade power meter includes a first circuit for metering a total DC power received at the at least one DC input channel from the photovoltaic array, a second circuit for metering a total DC power received at the at least one input-output channel from the battery pack, and a controller programmed to determine the portion of total AC output measured by the revenue grade power meter attributable to the at least one DC input channel and the at least one input-output channel.

In accordance with still another embodiment, a string inverter for use with a photovoltaic array includes at least one string-level DC input channel for receiving DC power from a photovoltaic array, at least one input-output channel for connecting the string inverter to a battery pack, a DC to DC buck-boost circuit coupled to the at least one DC input channel, the DC to DC buck-boost being configured to prevent more than a predetermined amount of voltage from reaching the battery pack, and a DC to AC inverter circuit having an AC output serving as an output of the string inverter.

In accordance with yet another embodiment, a string inverter for use with a photovoltaic array includes at least one string-level DC input channel for receiving DC power from a photovoltaic array, at least one input-output channel for connecting the string inverter to a battery pack, a DC to DC buck-boost circuit coupled to the at least one input-output channel, the DC to DC buck-boost being configured to prevent more than a predetermined amount of voltage from reaching the battery pack, and a DC to AC inverter circuit having an AC output serving as an output of the string inverter.

DETAILED DESCRIPTION OF THE INVENTION

In order to unlock the full potential of energy storage devices in solar energy generation systems and to ensure safe and efficient operation, there is a need for more sophisticated control systems and related circuitry that are capable of interfacing with high voltage, on-site energy storage systems. To that end, this disclosure teaches systems, methods, devices and related circuits that improve the operation of solar energy generation systems that incorporate localized energy storage.

Figure 1:
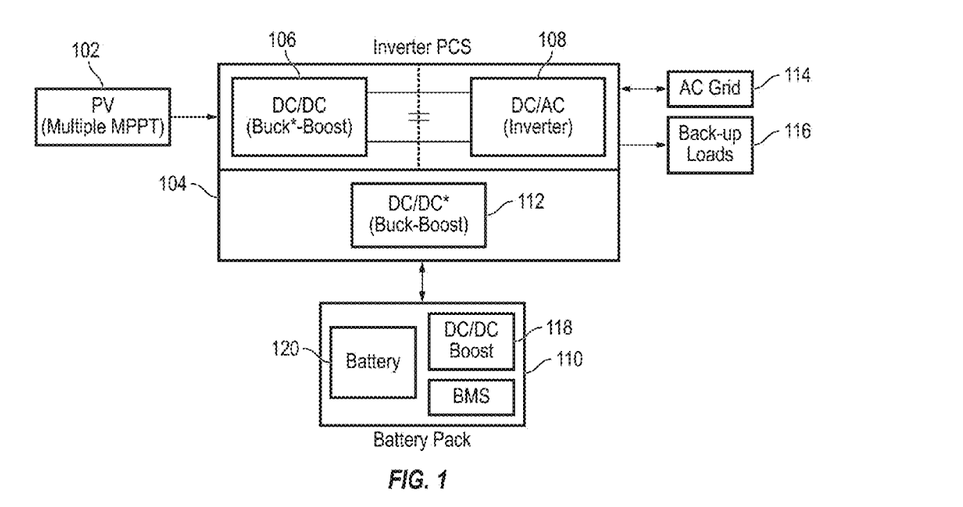
FIG. 1 illustrates a block diagram of an exemplary solar energy generation system according to one embodiment.
Figure 2:
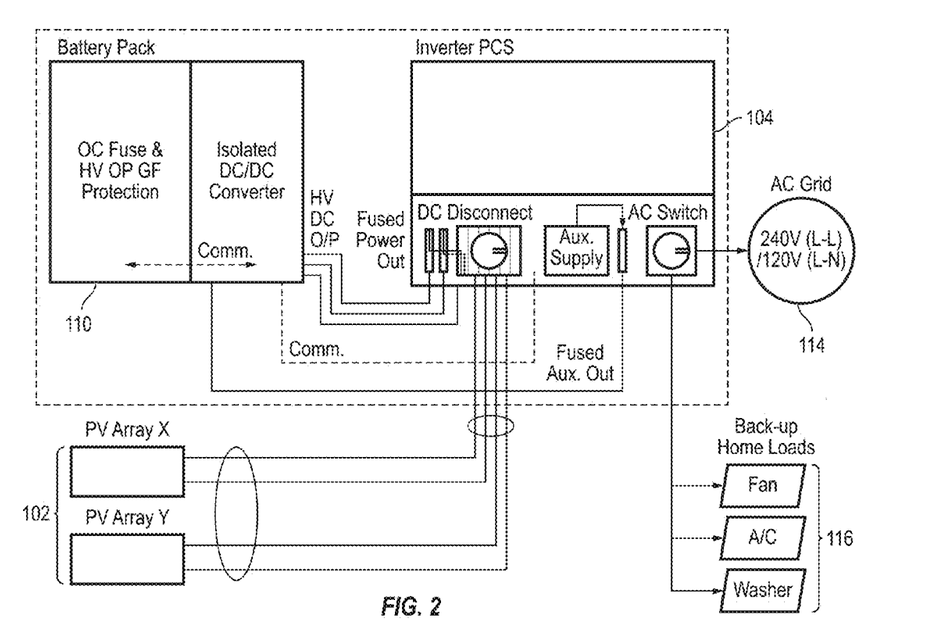
FIG. 2 illustrates a more detailed block diagram of the system shown in FIG. 1.

FIG. 1 illustrates a block diagram of an exemplary solar energy generation system according to various embodiments disclosed herein, and FIG. 2 illustrates a more detailed block diagram of the same system showing additional internal components, overall system wiring and inverter wiring compartment interconnections.

In the system of FIGS. 1 and 2, a pair of photovoltaic (PV) strings 102 are input to Inverter PCS (power control system) 104. Each string may comprise a plurality of PV panels (not shown) connected serially with an additive direct current (DC) voltage somewhere between 100 and 1000 volts, depending on such factors as the number of panels, their efficiency, their output rating, ambient temperature and irradiation on each panel. Also, each MPPT (maximum power-point tracking) channel input may receive the output of two or more separate strings connected in parallel (i.e., a two (or more)-to-one combiner at each MPPT channel input).

In some embodiments, when the high voltage DC line from each string is input to the inverter, it is subject to maximum power-point tracking (MPPT) at the string level (e.g., dual MPPT in the exemplary system of FIGS. 1 & 2). Alternatively, each module, or a number of individual modules in the respective strings, may include a DC optimizer that performs MPPT at the module level or N-module level output, rather than at the string level. The various embodiments are compatible with either centralized or distributed MPPT.

In some embodiments, the inverter may include a DC/DC conversion stage 106 at the PV input side. DC/DC stages are commonly employed to insure that the voltage supplied to the DC/AC stage 108 is sufficiently high for inversion. However, unlike conventional inverters, the inverter of FIGS. 1 and 2 also includes a DC link bus attached to a battery pack 110 so that the DC power coming from the strings can be used to deliver DC power to battery pack 110 to "charge the battery." The DC link bus is represented by the capacitor bank shown between the two DC-DC converters and the DC-AC section in FIG. 1. Battery pack 110 has a minimum and maximum associated operating voltage window. Because battery pack 110 has a maximum exposed input voltage limit that, in many cases, is lower than the theoretical maximum DC voltage coming off of the strings (open circuit voltage, $V_{OC}$), various embodiments of the invention include a buck-boost circuit 112 between the string-level PV input of inverter 104 and the DC-link connection to the battery pack. The inclusion of buck-boost circuit 112 will prevent voltages above a safe threshold from being exposed to battery pack 110 thereby eliminating the possibility of damage to battery pack 110 from overvoltage stress.

Figure 5:
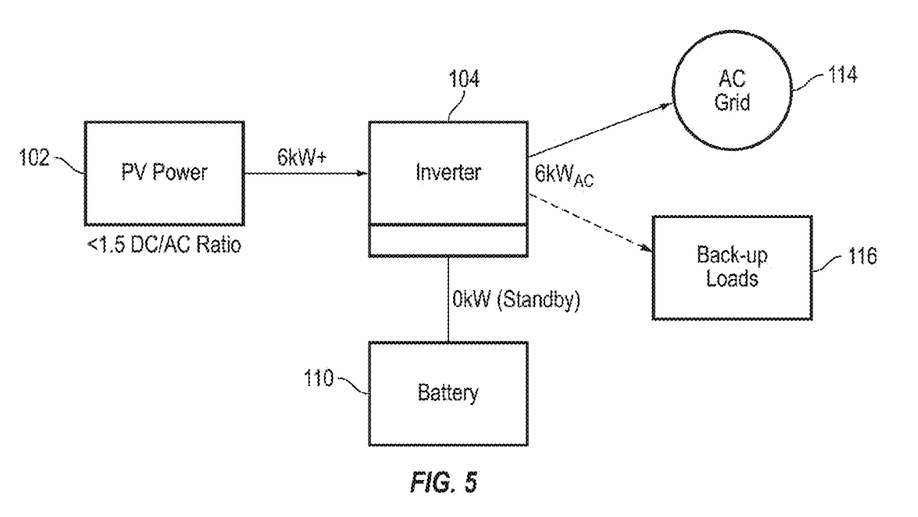
FIGS. 5-9 illustrate various possible power flow states of the inverter system according to various embodiments.

It should be appreciated that inverter 104 may have more than one mode of operation. In some modes, no power may be flowing from PV strings 102 to battery pack 110, while in other modes power may be flowing exclusively to the battery pack, while in still further modes power may be flowing to a combination of the battery pack and the AC grid. In a first mode, illustrated in FIG. 7, all available PV power may go to battery pack 110 as priority, with any surplus power being supplied to DC/AC stage 108 (FIG. 1) of inverter 104 to be supplied to the grid 114 or delivered to back-up loads 116. In a second mode, illustrated in FIG. 5, all generated power may be supplied to DC/AC stage 108 of inverter 104 and either used to power back-up loads 116, or supplied to the grid 114. In yet other modes, illustrated in FIGS. 6 and 8, battery pack 110 may be discharged to DC/AC stage 108 of inverter 104 alone (FIG. 8) and/or with PV power from the strings 102 (FIG. 6) to supply power to the AC grid 114 and/or back-up loads 116. In a further mode, illustrated in FIG. 9, power may come from the grid 114, through DC/AC inverter 108 (FIG. 1) to charge battery pack 110, for example, at a time when the PV array 102 is not generating power and demand for power is at its lowest point (e.g., after sunset). In various embodiments, the selection of mode may be controlled by logic in battery pack 110, in inverter 104, or in both, or selection could be based on signals from an external source. The various modes of operation are described in greater detail further below in the context of FIGS. 5-9.

With continued reference to the exemplary solar energy generation system of FIG. 1, in this figure, there are two blocks 106/112 labeled "DC/DC (Buck-Boost)". These blocks 106/112 represent alternative embodiments. In the first embodiment, the buck-boost circuit is located in the DC-link at the front end of inverter 104 (as depicted by block 106) so that the DC input(s) coming from PV strings 102 are always subject to buck or boost, keeping the voltage at DC link bus sufficiently high level for inversion while also preventing too high of a voltage from being presented to battery pack 110. In this embodiment, there is no need for a second buck-boost circuit anywhere else. In the second embodiment, the buck-boost circuit is located between the DC link bus of Inverter 104 and battery pack 110 (as depicted by block 112) such that the high voltage DC inputs from strings 102 only go through the buck-boost whenever voltage is exposed to battery pack 110. In this alternative embodiment, there may be an additional DC-DC boost stage at the input to the inverter but no need for a second buck circuit anywhere else. Either embodiment will prevent battery pack 110 from being exposed to excessively high voltages generated by the PV array. The voltage from the array could be as high as 500 Volts, or even 750 Volts in the case of a 1 kV PV system.

It should be appreciated that battery pack 110 in FIGS. 1 and 2 may be an exemplary commercially available residential li-ion battery pack with its own battery 120 only or battery 120 with DC/DC boost converter 118 or other topologies. Alternatively, battery 120 may be a lead acid battery, advanced lead acid battery, flow battery, organic battery, or other battery type. The various embodiments disclosed herein are compatible with numerous different battery chemistries. Various disclosed embodiments will work with other commercially available battery packs as well, however, the embodiments may have particular utility for systems that use high voltage battery packs (e.g., >48 volts) such as 200V-750V battery packs. As depicted by the dashed line boxing inverter PCS 104 and battery pack 110 in FIG. 2, inverter PCS 104 and battery pack 110 may be housed in a wall-mounted housing located inside or outside of a residence or a commercial building. Alternatively, battery pack 110 and inverter PCS 104 may be located in separate housings.

Figure 3:
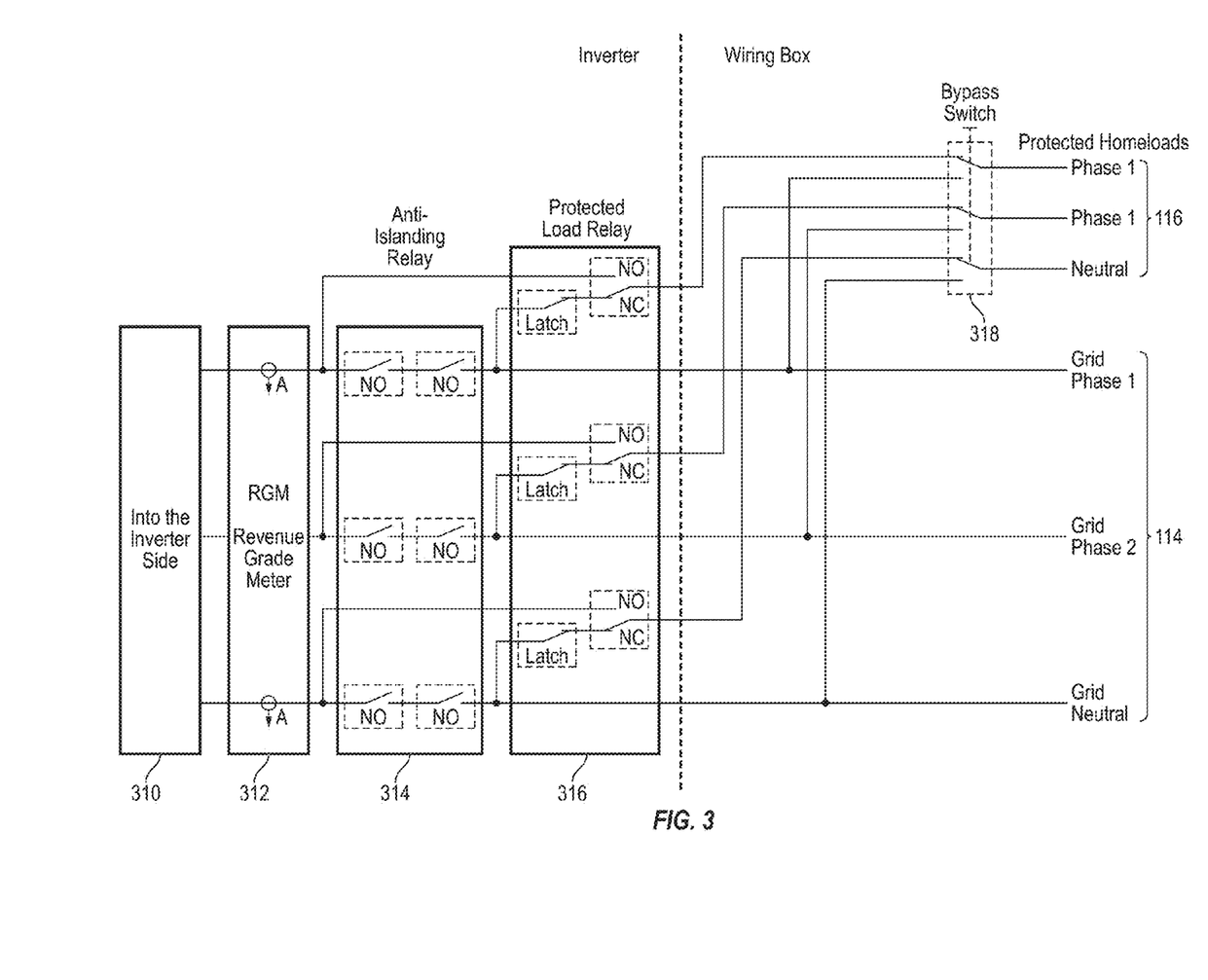
FIG. 3 illustrates two sides of an inverter box according to one embodiment.

Referring to FIG. 3, this figure illustrates two sides of an inverter box according to various embodiments of the invention. The left side, labeled "inverter," includes internal components that are generally in a fixed configuration and not intended to be modified by the installer or operator. The right hand side, labeled "wiring box," includes wire interfaces to AC grid 114 as well as a connection to protected or back-up home loads 116. For example, as shown in FIG. 2, back-up loads 116 could include an AC compressor, fan, and/or clothes washer. A refrigerator/freezer combination could be another back-up load. These are just examples and are not intended to be limiting. The particular back-up load may be at the discretion of the installer or homeowner need by wiring the inverter's AC output directly to one or more breakers in the home owner's or business's main electric panel. Providing a separate connection via the inverter PCS wiring box for back-up loads may enable the battery pack to serve as back-up power for certain loads in cases where the grid power is lost. It is noted that the grid standard depicted in FIG. 2 (240V L-L/120V L-N) is merely exemplary. Other grid standards, such as 208 1-ph, 3-ph/277 1-ph/480 3-ph, may be integrated with the various techniques described herein.

In a typical solar power generation system, the inverter includes a high accuracy alternating current (AC) revenue grade meter (RGM) at the output so that the solar provider and/or customer can ascertain how much power the system is generating at any given moment and over time, and in some cases so that the customer can be billed or compensated with energy credit. Typically, this information is transmitted wirelessly from the inverter to a wireless router located in the home or business so that it can be viewed on a local or remote graphical user interface. However, with the addition of a battery, it may be desirable to have the ability to make a more granular measurement of not only the inverter's output to the AC grid or back-up loads, but also the respective outputs of the photovoltaic system and the battery (e.g., what percentage of the total AC power is attributed to each source). In certain cases, such as when there is an outage of grid, it may be desirable to bill a customer for the power supplied to their back-up loads via the battery pack or PV power, since ordinarily when the grid is down, a string inverter stops outputting power.

Figure 4:
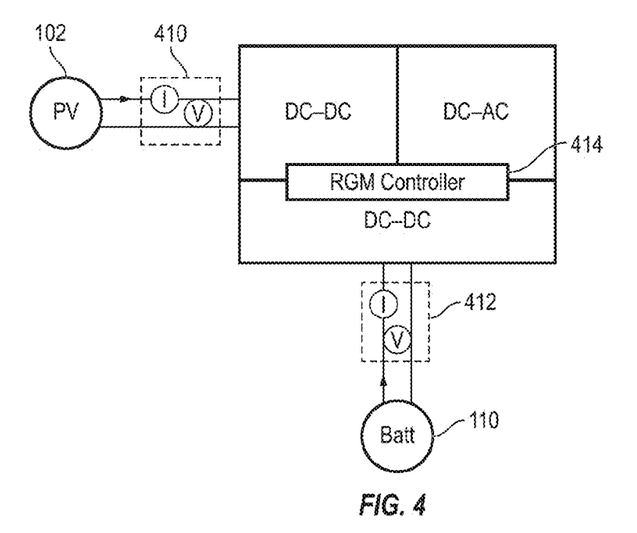
FIG. 4 illustrates a technique for metering the amount of power generated by the system.

In order to accomplish this, as depicted in FIGS. 3 and 4, revenue grade meter 312, in certain embodiments of the invention, makes separate DC measurements of power coming into the inverter from the PV system and the battery. Measurement circuit 410 accurately meters a total DC power received from photovoltaic array 102 by measuring the current (I), voltage (V) and power (P) at the DC input channel. Measurement circuit 412 meters a total DC power received from battery pack 110 by measuring the current (I), voltage (V) and power (P) at the input-output channel. A controller 414 may be programmed to determine the portion of total AC output measured by the revenue grade power meter attributable to photovoltaic array 102 and battery pack 110. By doing this, the combined AC output power measured by revenue grade meter 312 can be separately apportioned into power being generated by the PV system and the power being supplied by the battery pack. Also, as seen in FIGS. 2 and 3, in various embodiments, the wiring box side of inverter PCS 104 may include a single DC disconnect that enables an operator to manually shut off all DC power from battery and PV system.

An additional feature of the embodiment illustrated in FIG. 3 is a bypass switch 318 built into or external to the inverter PCS wiring box. In some embodiments, the switch may be a three-position switch. In a first position, switch 318 may connect the inverter to grid 114 and also connect the inverter to back-up loads 116 using an internal relay, such as relay 316 depicted in FIG. 3. In the second position, switch 318 may bypass back-up loads 116 directly to grid 114. The third position of the switch may open all circuits so that everything is disconnected, meaning, AC grid 114 and back-up loads 116 are disconnected from the inverter. This may be useful, for example, if the inverter side of the inverter PCS fails and needs to be serviced or replaced. As depicted in FIG. 3, the internal components of the inverter may include anti-islanding relay 314 and protected load relay 316. Relays 314 and 316 together with bypass switch 318 route power between the inverter and grid 114 and back-up loads 116 based at least in part on the position of bypass switch 318.

FIGS. 5-9 illustrate various possible power flow states of the inverter PCS system according to various embodiments. The various numerical values indicated in FIGS. 5-9 are exemplary and are provided solely for the purpose of more clearly conveying the various exemplary power flow states. In state 1, illustrated in FIG. 5, inverter 104 will deliver a maximum power output equivalent to the maximum power rating of PV array 102 less any conversion losses attributable to inverter 104. In this full PV inverter mode, battery pack 110 is on standby (not charging or discharging). In this state, the AC output power may, for example, be ~6 kW to grid 114 or back-up loads 116.

Figure 6:
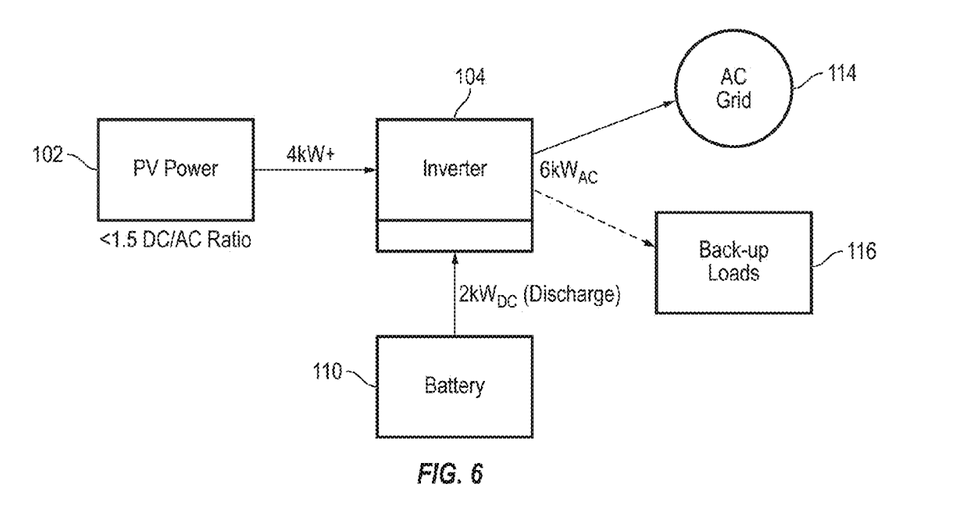

Referring to FIG. 6, this figure illustrates state 2, a combined PV and battery inverter mode, where the combined output of PV array 102 and battery pack 110 is inverted and supplied to AC grid 114 or back-up loads 116. In the example of FIG. 6, inverter 104 delivers a maximum AC output of, for example, ~6 kW, but only partial power (e.g., 4 kW) of it originates with solar power generation system 102 and the remaining power (e.g., 2 kW) is supplied by discharge capacity of battery pack 110. The AC output power may be delivered to grid 114 or back-up loads 116.

Figure 7:
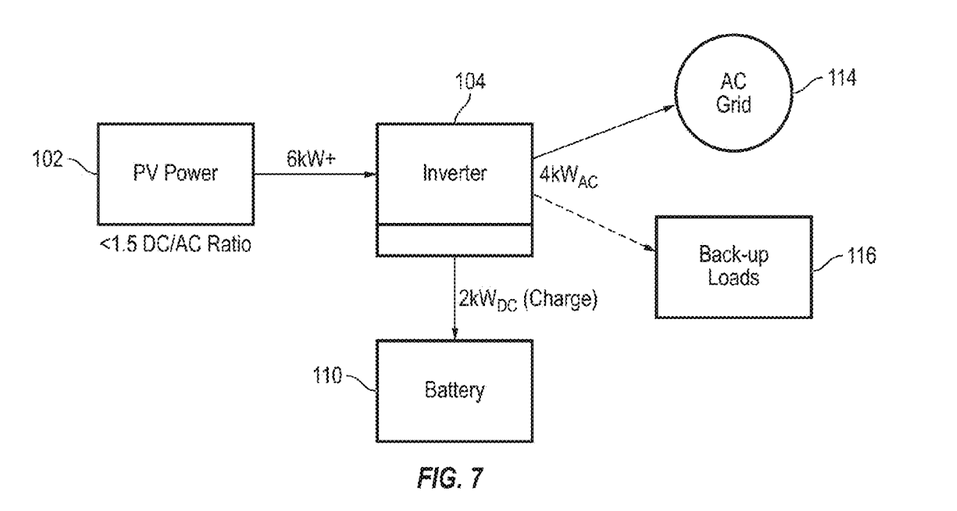

FIG. 7 illustrates state 3, another partial inverter mode, where PV array 102 is generating its theoretical maximum output (e.g., 6 kW+), which is supplied to inverter PCS 104. Instead of inverting all of that power, primarily partial power (e.g., 2 kW) is utilized to charge battery 110, with the remainder inverted and supplied to AC grid 114 or back-up loads 116. In an alternate exemplary embodiment where PV array 102 generates 8 kW+, battery pack 110 can be charged with 2 kW with a full 6 kW being provided to the AC grid/Back-up loads.

Figure 8:
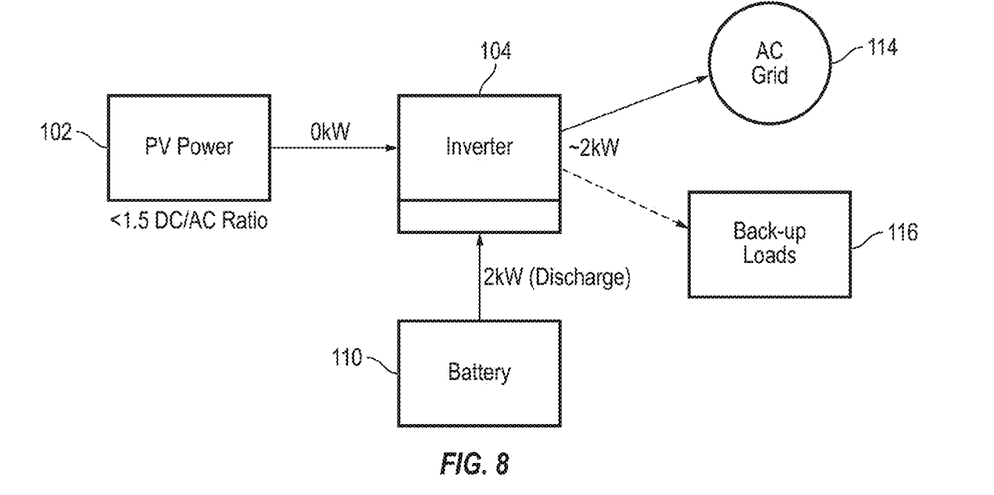

FIG. 8 illustrates state 4, called full battery inverter mode. In this mode, all the power supplied by inverter PCS 104 to AC grid 114 or back-up loads 116 originates from discharging of battery 110. This may occur, for example, at night or when PV system 102 is otherwise unable to generate power. In this example, the discharging battery 110 is, for example, only supplying ~2 kW of AC power. Typically, the power capacity of battery 110 will be less than or equal to the maximum output of PV array 102, though the disclosed embodiments are not intended to be limited as such. This mode may be useful to help level load sharing/moving situations and with peak shaving.

Figure 9:
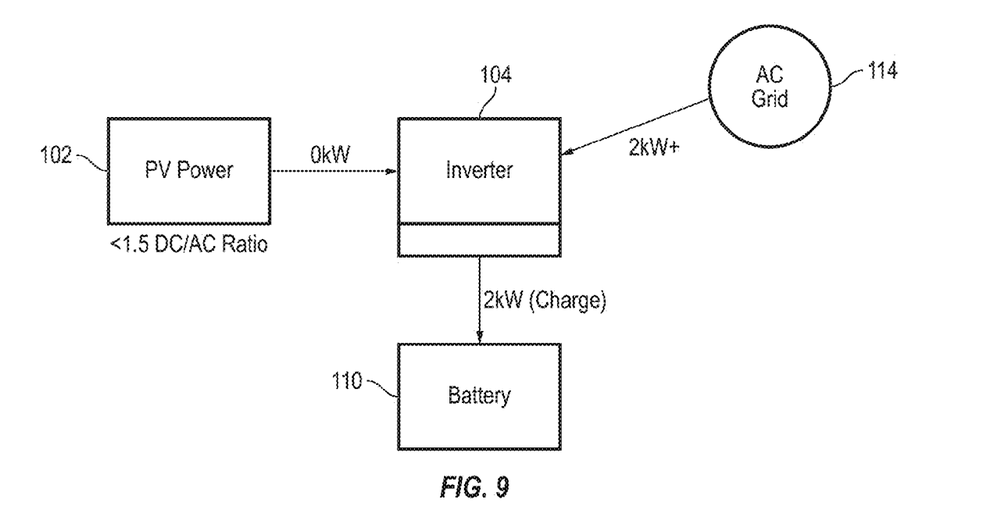

FIG. 9 illustrates a 5th state of power flow. In this state, like state 4, PV system 102 generates no power, however, grid 114 is supplying power back through the bi-directional inverter to charge battery 110. This could be done, for example, at a time when grid power demand is relatively low and less expensive. Then, later in the day, when demand quickly rises, the system could shift to mode 4 or a variant of that, where battery 110 either supplies power to grid 114 or to back-up loads 116.

The embodiments described herein are not to be limited in scope by the specific embodiments described above. Indeed, various modifications of the embodiments, in addition to those described herein, will be apparent to those of ordinary skill in the art from the foregoing description and accompanying drawings. Further, although some of the embodiments have been described herein in the context of a particular implementation in a particular environment for a particular purpose, those of ordinary skill in the art will recognize that their usefulness is not limited thereto and that they can be beneficially implemented in any number of environments for any number of purposes. Accordingly, the disclosure should be construed in view of the full breath and spirit of the embodiments as disclosed herein.

What is claimed is:

1. A string inverter for use with a photovoltaic array and configured to supply power to one or more back-up loads, the string inverter comprising:
   at least one string-level DC input channel for receiving DC power from a photovoltaic array, wherein the at least one input channel performs maximum power point tracking;
   at least one input-output channel for connecting the string inverter to a battery pack;
   a DC to DC buck-boost circuit coupled between the at least one string-level DC input channel and the at least one input-output channel for preventing more than a predetermined amount of DC voltage from reaching the battery pack;
   a DC to AC inverter circuit having an output terminal;
   a revenue grade power meter configured to measure an AC output of the string inverter provided on the output terminal; and
   a switch controlling a flow of power from the string inverter to the one or more back-up loads, the switch being a three-position switch, wherein in a first position, AC power is permitted to flow from the string inverter to a load side of a customer utility meter and the one or more back-up loads, in a second position, power is permitted to flow from the load side of a customer utility meter to the one or more back-up loads bypassing the string inverter with inverter output disabled, and in a third position, all circuits tied to the string inverter's output are electrically disconnected from the string inverter.

2. The string inverter according to claim 1, wherein the string inverter is operable to receive and rectify AC power into DC power, and to supply the DC power to the battery pack to charge it.

3. The string inverter according to claim 1, further comprising a DC disconnect switch operable to interrupt all DC input sources from reaching the string inverter.

4. A string inverter for use with a photovoltaic array, comprising:
   at least one string-level DC input channel for receiving DC power from a photovoltaic array, wherein the at least one input channel performs maximum power point tracking;
   at least one input-output channel for connecting the string inverter to a battery pack;
   a DC to DC buck-boost circuit coupled between the at least one string-level DC input channel and the at least one input-output channel for preventing more than a predetermined amount of DC voltage from reaching the battery pack;
   a DC to AC inverter circuit having an output terminal;
   a revenue grade power meter configured to measure an AC output of the string inverter provided on the output terminal;
   a first circuit for metering a total DC power received at the at least one DC input channel from the photovoltaic array;
   a second circuit for metering a total DC power received at the at least one input-output channel from the battery pack; and
   a controller programmed to determine the portion of total AC output measured by the revenue grade power meter attributable to the at least one DC input channel and the at least one input-output channel respectively.

5. The string inverter according to claim 4, further comprising a wireless transmitter that transmits the respective portions of total AC output attributable to the at least one DC input channel and the at least one input-output channel to a network-connected wireless gateway.

6. A string inverter for use with a photovoltaic array, comprising:
   at least one string-level DC input channel for receiving DC power from a photovoltaic array;
   at least one input-output channel for connecting the string inverter to a battery pack;
   a DC to DC buck-boost circuit coupled between the at least one string-level DC input channel and the at least one input-output channel, the DC to DC buck-boost being configured to prevent more than a predetermined amount of DC voltage from reaching the battery pack;
   a DC to AC inverter circuit having an output terminal;
   a revenue grade power meter configured to measure an AC output of the string inverter provided on the output terminal;
   a first circuit for metering a total DC power received at the at least one DC input channel from the photovoltaic array;
   a second circuit for metering a total DC power received at the at least one input-output channel from the battery pack; and
   a controller programmed to determine the portion of total AC output measured by the revenue grade power meter attributable to the at least one DC input channel and the at least one input-output channel respectively.

7. The string inverter according to claim 6, wherein the DC to DC buck-boost circuit is coupled to the at least one string-level DC input channel.

8. The string inverter according to claim 6, wherein the DC to DC buck-boost circuit is coupled to the at least one input-output channel.

9. The string inverter according to claim 6 configured to supply output power to one or more back-up loads.

10. The string inverter according to claim 9, further comprising a switch controlling a flow of power from the string inverter to the one or more back-up loads.

11. The string inverter according to claim 6, wherein the string inverter is operable to receive and rectify AC power to DC power, and to supply the DC power to the battery pack to charge it.

12. The string inverter according to claim 6, further comprising a DC disconnect switch operable to interrupt all DC input sources from reaching the string inverter.

13. The string inverter according to claim 6, further comprising a wireless transmitter that transmits the respective portions of total AC output attributable to the at least one DC input channel and the at least one input-output channel to a network-connected wireless gateway.

14. A string inverter for use with a photovoltaic array, comprising:
- at least one string-level DC input channel for receiving DC power from a photovoltaic array;
- at least one input-output channel for connecting the string inverter to a battery pack;
- a DC to DC buck-boost circuit coupled between the at least one string-level DC input channel and the at least one input-output channel, the DC to DC buck-boost being configured to prevent more than a predetermined amount of DC voltage from reaching the battery pack;
- a DC to AC inverter circuit having an output terminal;
- a revenue grade power meter configured to measure an AC output of the string inverter provided on the output terminal; and
- a three-position switch controlling a flow of power through the string inverter, wherein the switch is configured so that in a first state, AC power is permitted to flow from the string inverter to a load side of a customer utility meter and one or more back-up loads, in a second state, power is permitted to flow from the load side of a customer utility meter to the one or more back-up loads bypassing the string inverter with inverter output disabled, and in a third state, all circuits tied to the string inverter's output are electrically disconnected from the inverter.

* * * * *